United States Patent [19]

Hoffman et al.

[11] Patent Number: 5,071,239

[45] Date of Patent: Dec. 10, 1991

[54] CATADIOPTRIC CONICALLY SCANNING TELESCOPE

[75] Inventors: Nelson N. Hoffman, Palm City, Fla.; Harry R. McKinley, South Hampton, Mass.; Bernard B. Silverman, Delray Beach, Fla.

[73] Assignee: United Technologies Corporation, Hartford, Conn.

[21] Appl. No.: 314,517

[22] Filed: Feb. 23, 1989

[51] Int. Cl.$^5$ .............................................. G02B 17/08
[52] U.S. Cl. .................................... 359/728; 359/727
[58] Field of Search ............... 350/442, 443, 444, 445, 350/441

[56] References Cited

U.S. PATENT DOCUMENTS 3,325,238 6/1967 Geier .................................... 350/443

Primary Examiner—Scott J. Sugarman
Attorney, Agent, or Firm—Peter R. Ruzek

[57] ABSTRACT

A beam of light issued by a light source enters a catadioptric arrangement and initially travels therethrough along an axis. At least one lens is situated at the axis and is axially delimited by two curved major surfaces having respective centers of curvature. The beam of light is reflectively diverted from the axis and travels in a path which includes a path section that is directed at one of the major surfaces and has such a spatial orientation relative to the axis and the major surfaces that light traveling in this path section bypasses the centers of curvature and impinges all regions of the major surfaces at angle deviating from respective normals to the regions with attendant avoidance of specular retroreflection from such regions.

12 Claims, 1 Drawing Sheet

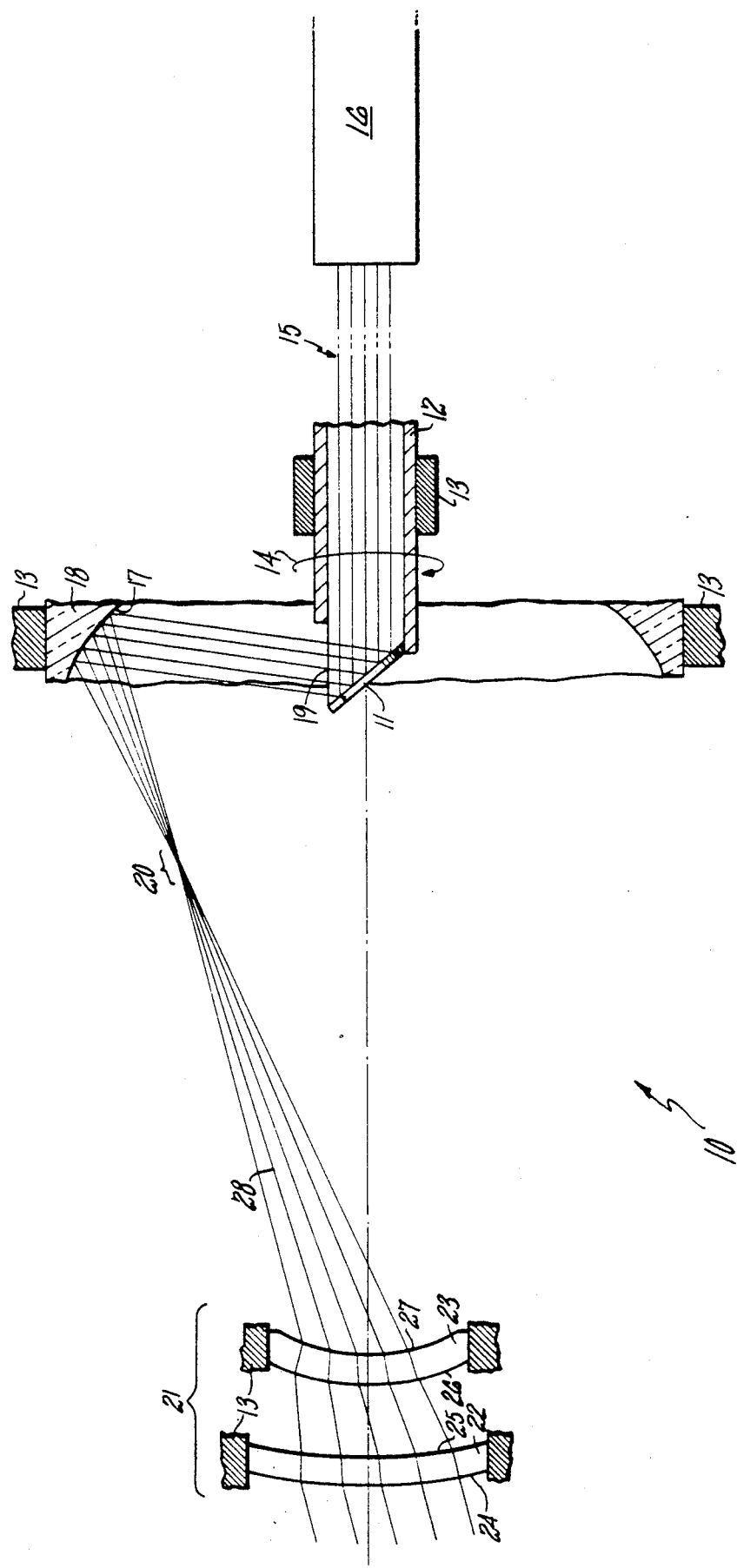

CATADIOPTRIC CONICALLY SCANNING TELESCOPE

FIELD OF THE INVENTION

The present invention relates to optical scanning arrangements in general, and more particularly to catadioptric conically scanning telescope.

DESCRIPTION OF THE PRIOR ART

There are already known various constructions of optical scanning arrangements, among them such that perform the scanning in a conical manner. Examples of such scanning arrangements are disclosed in U.S. Pat. Nos. 3,156,823; 3,782,835; 3,817,593; 3,847,466; 4,030,807; 4,039,246; 4,128,297; 4,395,095; 4,409,478 and 4,413,177. Many of such optical scanning arrangements are catadioptric, that is, they employ both refractive and reflective components in the path of light. Optical conically scanning arrangements of the above types are being used for a variety of purposes and their respective constructions vary in dependence on the use to which such arrangements are to be put. In most of such applications, reflection of some of the light from any major surface delimiting a respective lens and traversed by the light is of no consequence or of an only insignificant consequence, except that such reflected light is lost for the desired purpose.

However, such lens reflection may constitute a significant detriment in conically scanning optical arrangements that are incorporated in conically scanning Doppler laser sensor systems which may be used, for instance, to resolve the orthogonal velocity components of an extended moving target. Systems of this kind may be employed, for instance, as airborne Doppler navigating devices using terrain as the target, or as airspeed sensor devices using aerosol backscatter as a target substitute. Conical scanning may also be used in other laser sensor system applications, such as in beam rider guidance and in homing seeker tracking discriminants.

For one reason or another, be it complexity, weight, dimensions, driving power requirements, optical idiosyncrasies, or other, the constructions of the conically scanning arrangements disclosed in the above references are not very well suited for use in Doppler laser sensor systems of the above kind. Thus, other scanning arrangement constructions have been employed in such systems. One of such previously used constructions utilizes a rotating wedge for the generation of the conical scanning motion. Yet, even the scanning arrangement using this approach does not necessarily overcome the above disadvantages or has other drawbacks. So, for instance, the rotating wedge has to be large enough to accommodate the system output aperture, which significantly contributes to the weight, dimensions and driving power consumption of the system, all of which are to be kept to a minimum in the aforementioned applications. Also, the wedge scanners have generally constituted sources of significant transmitter backscatter. Such internal backscatter has limited the minimum detectable velocity in continuous wave Doppler systems, and has limited the minimum detectable range in pulsed systems.

Another previously used approach to the generation of the desired conical scanning motion in Doppler laser sensor systems to be used for the above applications has involved the use of a pair of orthogonal, galvanometer driven, pre-objective mirrors. However, such mirrors usually require relatively large sinusoidal excursions, which again undesirably increases the dimensions, weight and driving power requirements. Furthermore, such mirrors also introduce undesirable Doppler frequency broadening in the transmitted and received laser beams. Thus, it may be seen that even the scanning arrangement embodying this approach exhibits certain undesirable characteristics.

Accordingly, it is a general object of the present invention to avoid the disadvantages of the prior art.

More particularly, it is an object of the present invention to provide a catadioptric conically scanning telescope for use especially in Doppler laser sensor systems, which does not possess the disadvantages of the known arrangements of this kind.

Still another object of the present invention is so to develop the arrangement of the type here under consideration as to minimize if not eliminate altogether the undesirable specular retroreflection of light from the major surfaces delimiting any lens or any reflecting surface used in the arrangement and traversed by the light back to the light source.

It is yet another object of the present invention to devise an arrangement of the above type which significantly improves the overall sensitivity of the system in which it is being used.

A concomitant object of the present invention is to design the scanning arrangement of the above type in such a manner as to be relatively simple in construction, inexpensive to manufacture, easy to use, and reliable and accurate in operation.

SUMMARY OF THE INVENTION

In keeping with these objects and others which will become apparent hereafter, one feature of the present invention resides in a catadioptric arrangement which includes a light source that is stationarily mounted on a support and issues a beam of light which initially travels along an axis in a path section. At least one lens is mounted on the support so as to be situated at the axis and is axially delimited by two curved major surfaces having respective centers of curvature. According to the invention, there is further provided means for reflectively diverting the beam of light from the axis for travel in a path including a further path section that is directed at one of the major surfaces and has such a spatial orientation relative to the axis and the major surfaces that light traveling in the further path section bypasses the centers of curvature and impinges all regions of the major surfaces at angles deviating from respective normals to the regions with attendant avoidance of specular retroreflection from the regions.

A particularly advantageous embodiment of the present invention utilizes as the reflectively diverting means a flat mirror mounted on a hollow shaft, which surrounds the initial path section of the light beam, so as to include an acute angle with the axis, and an ellipsoidal additional mirror which circumferentially completely surrounds the axis at a distance therefrom. Then, the hollow shaft is rotated about the axis and the light beam as diverted from the initial path section impinges circumferentially successive regions of the additional mirror and is reflected therefrom into the further path section which thus orbits about the axis with attendant conical scanning of the target area.

BRIEF DESCRIPTION OF THE DRAWING

The present invention will be described in more detail below with reference to the sole FIGURE of the accompanying drawing which is a simplified axial sectional view of a catadioptric conically scanning arrangement of the present invention as employed in conjunction with a laser source.

DESCRIPTION OF THE PREFERRED EMBODIMENT

Referring now to the drawing in detail, it may be seen that the reference numeral 10 has been used therein to identify a conically scanning arrangement of the present invention in its entirety. The arrangement 10 includes a rotating flat mirror 11 which is mounted on a hollow shaft 12 for rotation therewith. The hollow shaft 12 is supported on a support 13 for rotation relative thereto. The flat mirror 11 extends at an acute angle of, for instance, about 40° with respect to the longitudinal axis of the hollow shaft 12.

During the operation of the arrangement 10, the hollow shaft 12 is caused, by a non-illustrated drive of any known construction, to rotate about its longitudinal axis, as indicated by an arrow 14. A laser beam 15 issued by a laser 16 passes through the interior of the hollow shaft 12 in substantial parallelism with its longitudinal axis until it impinges the flat mirror 11 and is reflected and diverted thereby for travel through an opening 19, which is provided in the hollow shaft 12 for this purpose, toward a region of a reflective surface 17 of a mirror element 18.

In the drawing, the mirror element 18 is shown as being possibly only an axially limited fragment of a larger structure which may have an axial dimension selected so as to accommodate the laser beam 15 as reflected from the rotating flat mirror 11 under all operating conditions. The mirror element 18 is stationarily mounted on the support 13 and is centered on the longitudinal axis of the hollow shaft 12. The reflecting surface 17 of the mirror element 18 preferably has a configuration of a part of an ellipsoid so as to focus the laser beam toward a neck region 20, after the passage through which the laser beam 15 diverges. It will be appreciated that, as the hollow shaft 12 rotates, so does the flat mirror 11 so that the laser beam 15 is cyclically reflected by the flat mirror 11 toward circumferentially successive regions of the reflective surface 17 of the mirror element 18, and the neck region 20 of the laser beam 15 as reflected from the surface 17 correspondingly orbits about an extension of the longitudinal axis of the hollow shaft 12.

The diverging portion of the laser beam 15 is directed against an objective 21 which is shown to include two lenses 22 and 23 which are mounted on the support 13 in series with one another as considered in the direction of the aforementioned extension of the longitudinal axis of the hollow shaft 12 and each of which is centered on this extension. One or both of the lenses 22 and 23 may be supported on the support 13 for movement in the axial direction so as to be able to collimate or focus the outgoing laser beam 15 emerging from the lens 22 in the leftward direction as considered in the drawing, as desired. The objective lenses 22 and 23 have respective major surfaces 24 and 25, and 26 and 27 which axially delimit the respective lenses 22 and 23 and which are traversed by the laser beam 15 with attendant refraction.

It may be seen that, in accordance with the present invention, the laser beam 15 approaches the objective 21 in a path section 28 which is inclined with respect to the aforementioned longitudinal axis, while all of the major surfaces 24, 25, 26 and 27 of the lenses 22 and 23 are shown to be curved in the same sense and their centers of curvature are situated on the longitudinal axis extension to the right from the lenses 22 and 23 as considered in the drawing and at such a distance from the respective lenses 22 and 23 that the laser beam 15 bypasses such centers of curvature as it travels in the path section 28, which also orbits about the longitudinal axis extension, in all angular positions of the path section 28. This expedient assures that there is no region of the major surfaces 24, 25, 26 and 27 of the lenses 22 and 23 which would be reached by the laser beam 15 at a normal angle of incidence, with attendant specular retroreflection of the affected laser beam light for travel back along its original trajectory to the laser 15, where it could interfere with the laser operation, and/or to any non-illustrated sensor which may be arranged downstream, as considered in the return direction, of the internal passage of the hollow shaft 11, such as downstream of a non-illustrated beam splitter interposed between the hollow shaft 11 and the laser 16, at which sensor it could otherwise generate a false return signal and thus cause unwanted clutter or noise which would decrease the sensitivity, that is increase the lower threshold, of the sensor or at least partially obscure the true return signals stemming from the reflection from the respective target of the laser light that had previously emerged from the objective 21.

It may be seen that the arrangement 10 constructed in accordance with the present invention encompasses some important features constituting a significant advance over the prior art. For one, because of the avoidance of the specular backscatter from the refractive components of the catadioptric optical train, the arrangement 10 is particularly well suited for use in helicopter or other aircraft airspeed sensor system or in other sensing systems that utilize conically scanning laser beams for target acquisition, ranging, speed or distance detection or the like. On the other hand, inasmuch as the relatively small flat folding mirror 11, which consequently has a very low inertia, constitutes the only rotationally moving component of the optical train, with the ellipsoid mirror element 18 and the objective lenses 22 and 23, which have considerably larger inertial masses, being mounted on the support 13 so as to be stationary relative thereto at least in the circumferential direction, the possibility that unwanted disruptions could be introduced into the outgoing laser beam 15 and/or into the returning laser light by vibrations of the components of the optical train or the like is reduced to the absolute minimum.

However, it will be appreciated that only a circumferential segment of the mirror element 18 could be used instead of the circumferentially complete mirror element 18 illustrated in the drawing, in which case this segment would be mounted for joint synchronous rotation with the hollow shaft 12. However, under these circumstances such mirror segment would have to be properly dynamically counterbalanced, and the arrangement 10 could be used only in environments in which it is not subjected to frequent or sudden external forces, accelerations, or spatial position changes which would displace the longitudinal axis of the hollow shaft 12 and cause vibrations of the mirror segment relative to the remainder of the arrangement 10.

While the present invention has been illustrated and described as embodied in a particular construction of a conical scanning laser sensor system, it will be appreciated that the present invention is not limited to this particular example. So, for instance, the arrangement of the present invention could be used without the laser but with the aforementioned sensor as a receiver for incoming light originating at a light source situated at the exterior of the arrangement proper. Therefore, the scope of protection of the present invention is to be determined solely from the attached claims.

We claim:

1. A catadioptric arrangement comprising
   a support,
   a light source issuing a beam of light travelling along an axis exclusively in an initial path section;
   at least one lens mounted on said support so as to be situated at said axis and axially delimited by two curved major surfaces having respective centers of curvature; and
   means for reflectively diverting said beam of light in its entirety from said axis for travel in a diversion path including a further path section that is directed at one of said major surfaces and has such a spatial orientation relative to said axis and said major surfaces that light traveling in said further path section bypasses said centers of curvature and impinges all regions of said major surfaces at angles deviating from respective normals to said regions with attendant avoidance of specular retroreflection from said regions.

2. The arrangement as defined in claim 1, wherein said reflectively diverting means includes a diverting mirror situated at said axis between said initial path section and said diversion path and extending at an acute angle with respect to said axis.

3. The arrangement as defined in claim 2, wherein said reflectively diverting means includes an additional mirror situated in said diversion path at a distance from said axis and operative for reflecting light reaching said additional mirror from said diverting mirror into said further path section.

4. The arrangement as defined in claim 3, wherein said diverting mirror has a flat reflective surface.

5. The arrangement as defined in claim 4, wherein said additional mirror has a concave reflecting surface.

6. The arrangement as defined in claim 5, wherein said concave reflecting surface has an ellipsoidal configuration.

7. The arrangement as defined in claim 3, wherein said additional mirror has a concave reflecting surface.

8. The arrangement as defined in claim 1, wherein said centers of curvature of said major surfaces are located on said axis.

9. The arrangement as defined in claim 1, and further comprising an additional lens arranged in series with said one lens and delimited by two additional curved major surfaces having additional centers of curvature which are also situated in such a manner that the light traveling in said further path section bypasses said additional centers of curvature.

10. The arrangement as defined in claim 1, wherein said light source includes a laser.

11. A catadioptric arrangement comprising
    a support;
    a light source issuing a beam of light travelling along an axis in an initial path section;
    at least one lens mounted on said support so as to be situated at said axis and axially delimited by two curved major surfaces having respective centers of curvature;
    means for reflectively diverting said beam of light from said axis for travel in a diversion path including a further path section that is directed at one of said major surfaces and has such a spatial orientation relative to said axis and said major surfaces that light traveling in said further path section bypasses said centers of curvature and impinges all regions of said major surfaces at angles deviating from respective normals to said regions with attendant avoidance of specular retroreflection from said regions, including
    a diverting mirror situated between said initial path section and said diversion path and extending at an acute angle with respect to said axis,
    means for rotating said diverting mirror about said axis while maintaining said acute angle thereof relative to said axis, and
    an additional mirror situated in said diversion path at a distance from said axis and operative for reflecting light reaching said additional mirror from said diverting mirror into said further path section, said additional mirror being substantially mounted on said support and extending circumferentially around said axis at said distance therefrom to be impinged by the light reflected by said diverting mirror in all angular positions of said diverting mirror about said axis.

12. The arrangement as defined in claim 11 wherein said rotating means includes a hollow shaft having said diverting mirror mounted thereon and having an internal passage for the passage of the laser beam traveling in said initial path section therethrough and an opening for the passage of the laser beam reflected by said diverting mirror therethrough toward said additional mirror.

* * * * *

UNITED STATES PATENT AND TRADEMARK OFFICE
CERTIFICATE OF CORRECTION

PATENT NO. : 5,071,239

DATED : December 10, 1991

INVENTOR(S) : Nelson N. Hofman et al

It is certified that error appears in the above-identified patent and that said Letters Patent is hereby corrected as shown below:

In the Abstract: Line 12, "angle" should be --angles--;

Col. 6, line 42, "substantially" should be --stationarily--.

Signed and Sealed this

Twenty-sixth Day of October, 1993

Attest:

BRUCE LEHMAN

Attesting Officer　　　Commissioner of Patents and Trademarks